United States Patent [19]

Matsuda

[11] Patent Number: 5,285,440
[45] Date of Patent: Feb. 8, 1994

[54] MAGNETO-OPTIC DISK

[75] Inventor: Nobuhide Matsuda, Hirakata, Japan

[73] Assignee: Matsushita Electric Industrial Co., Ltd., Osaka, Japan

[21] Appl. No.: 945,859

[22] Filed: Dec. 11, 1992

Related U.S. Application Data

[63] Continuation of Ser. No. 439,370, Nov. 13, 1989, abandoned.

[30] Foreign Application Priority Data

Mar. 18, 1988 [JP] Japan ................... 63-66618
Mar. 18, 1988 [JP] Japan ................... 63-66620

[51] Int. Cl.$^5$ ..................... G11B 7/24; G11B 13/04
[52] U.S. Cl. .................... 369/275.3; 369/32; 369/44.26; 369/44.28; 369/47
[58] Field of Search ................ 369/13, 14, 47, 48, 369/54, 58, 59, 275.3, 32, 44.26, 44.28; 360/114, 59; 365/122

[56] References Cited

U.S. PATENT DOCUMENTS

| | | | |
|---|---|---|---|
| 4,638,472 | 1/1987 | Ogata et al. | 369/54 |
| 4,791,622 | 12/1988 | Clay et al. | 369/54 X |
| 4,807,210 | 2/1989 | Kaku et al. | 369/13 X |
| 4,879,704 | 11/1989 | Takagi et al. | 369/48 |
| 4,888,753 | 12/1989 | Enari et al. | 369/47 X |
| 4,910,725 | 3/1990 | Drexler et al. | 369/47 X |
| 5,063,546 | 11/1991 | Ito et al. | 369/32 |

FOREIGN PATENT DOCUMENTS

| | | | |
|---|---|---|---|
| 57-103134 | 6/1982 | Japan . | |
| 61-39237 | 2/1986 | Japan . | |
| 62-170042 | 7/1987 | Japan . | |
| 62-208432 | 9/1987 | Japan . | |
| 1-133233 | 5/1989 | Japan | 369/59 |

Primary Examiner—Hoa T. Nguyen
Attorney, Agent, or Firm—Stevens, Davis, Miller & Mosher

[57] ABSTRACT

A magneto-optic disk includes tracks each of which is divided into a plurality of blocks in order to define the locations where data is stored. Each block has address information recorded as a pit providing an address. The plurality of blocks are arranged non-equidistantly, or the pattern is changed according to the track position, to enable detection of a sector position or a track position.

4 Claims, 6 Drawing Sheets

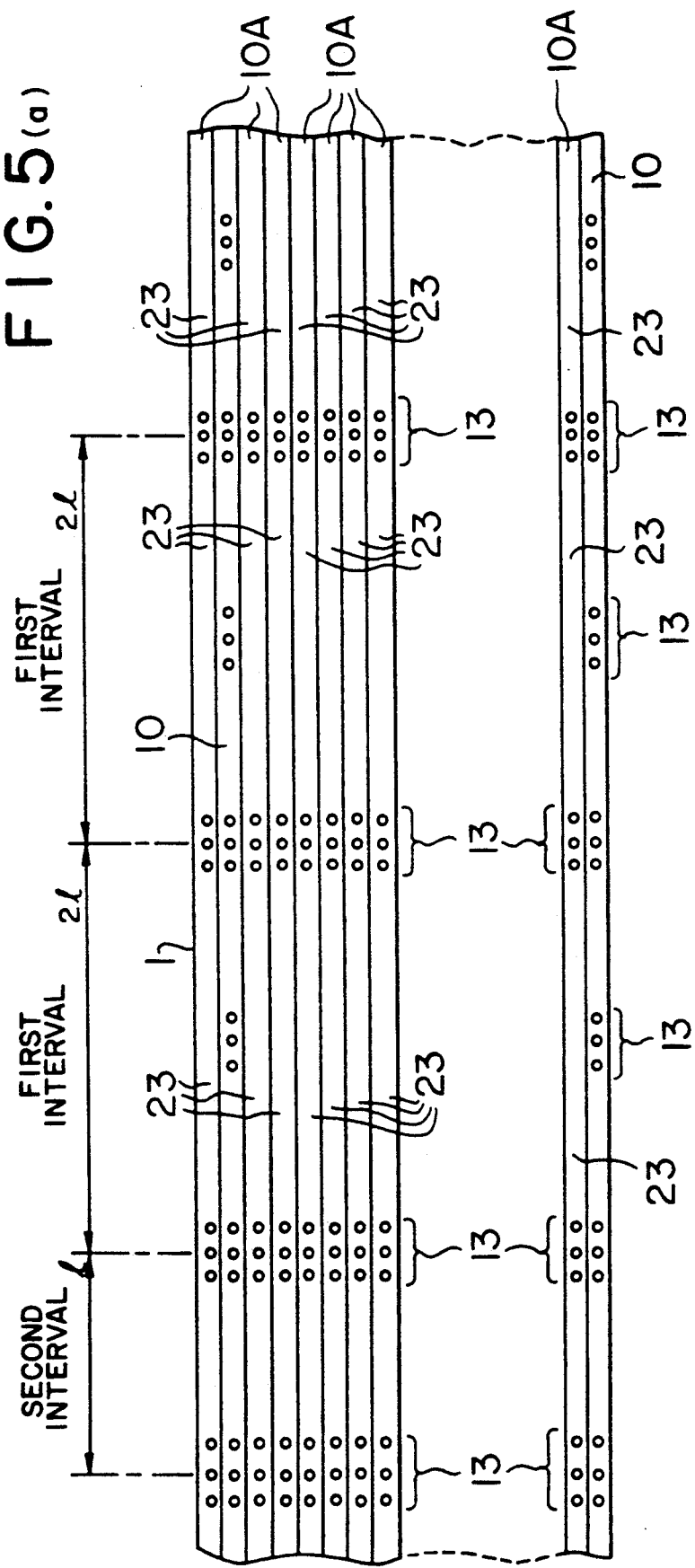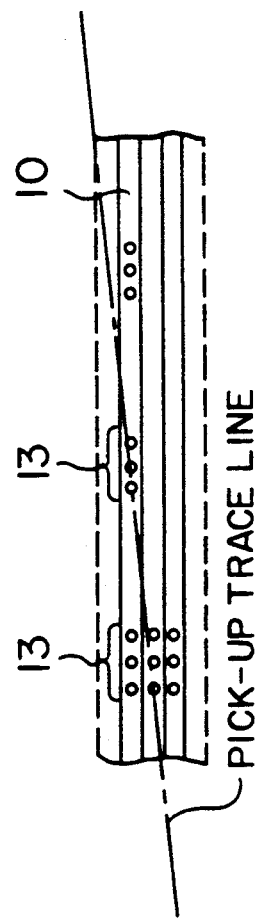

FIG. 6
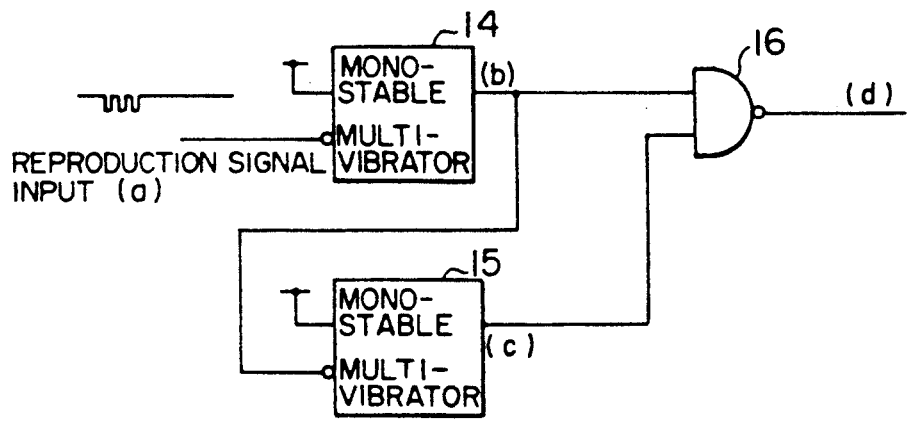
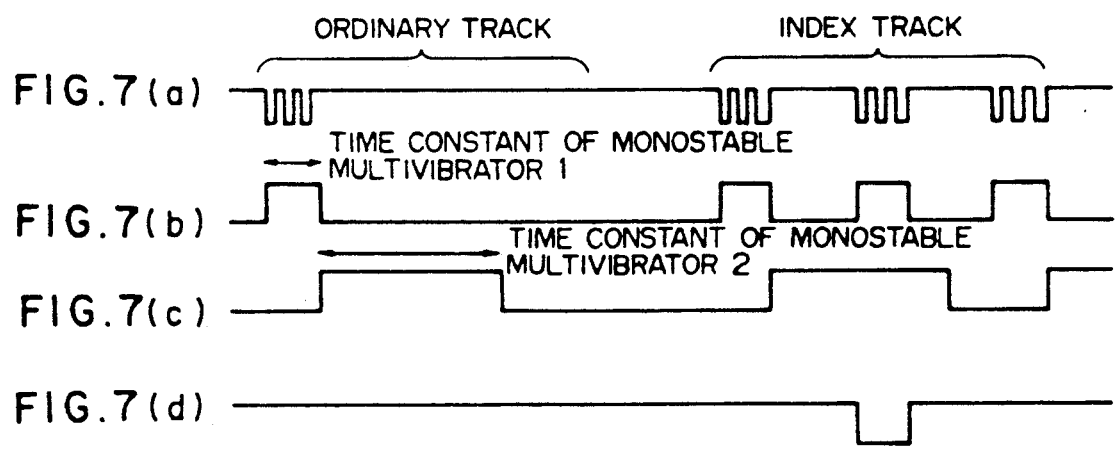

FIG. 8
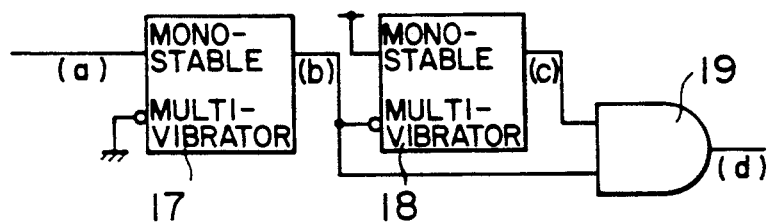
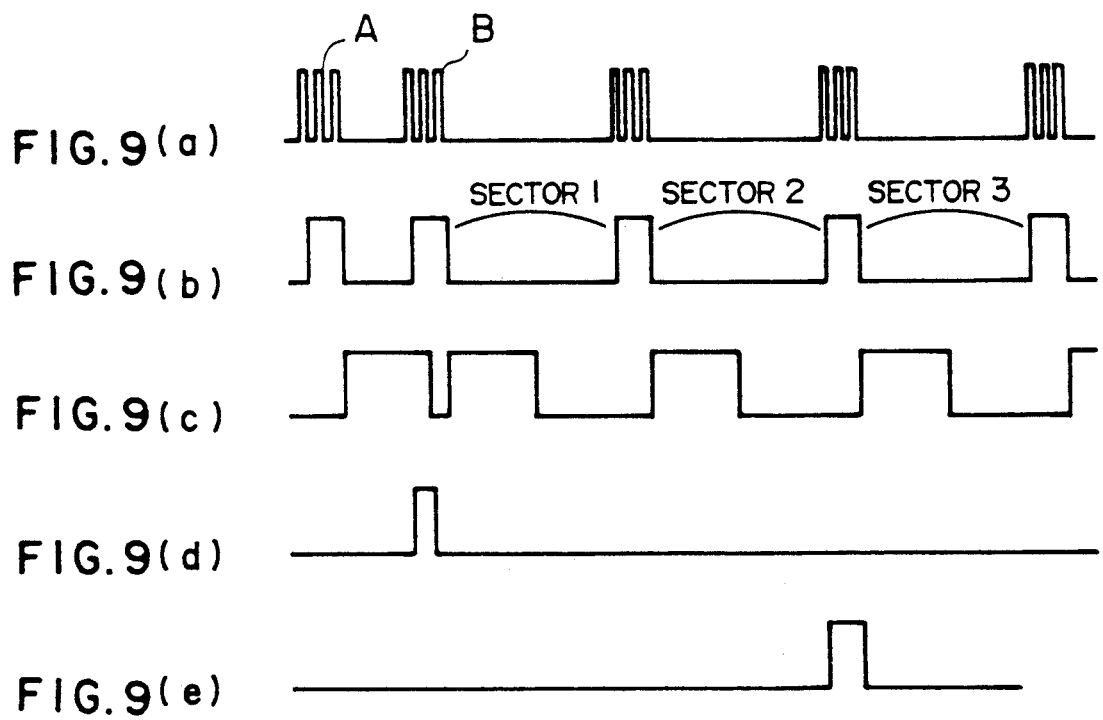

MAGNETO-OPTIC DISK

This application is a continuation of application Ser. No. 07/439,370, filed Nov. 13, 1989 (abandoned).

FIELD OF THE INVENTION

The present invention relates to a magneto-optic disk. More particularly, it is intended to provide a magneto-optic disk of a simple configuration in which a predetermined position is efficiently accessible.

BACKGROUND OF THE INVENTION

A magneto-optic disk is used as an optical disk for a large-capacity memory where the capacity of erasing and rewriting information on the disk is necessary. In the case where a magneto-optic disk is used as a data recording and reproducing apparatus, in order to define disk locations containing the data, each track is divided into a plurality of blocks called "sectors" in each of which a track No. and a sector No. providing an address separate from the data is recorded as an uneven pit. This track No. and sector No. are detected based on the intensity of reflected light if an optical pick-up is used, and may be taken out as a signal different from a magneto-optic signal detected by the rotation of the plane of polarization of the light. If a predetermined location containing data is to be detected by an optical pick-up, first, a track No. is read out and the optical pick-up is moved to a predetermined track. Then, the sector No. is read out, and the optical pick-up is moved to a predetermined sector thereby ending the operation. In this way, in driving the conventional magneto-optic disks, decoding a number code is required for decoding the track No. and sector No, and for this purpose, a circuit and microcomputer or the like on a considerably large scale are required to perform the decoding operation.

Next, a conventional configuration for accessing to a predetermined location containing the data will be described specifically.

A configuration of a common track access in a conventional magneto-optic disk is shown in FIG. 1. In this configuration, an address consisting of a track No. and a sector No. on a magneto-optic disk 1 is read by an optical pick-up 2 and the difference between a target track and the present position is determined. A control circuit 3 drives a traverse motor 4 for moving the optical pick-up 2, and when the target track is approached, an address on the disk is read again, so that an actuator 5 on the optical pick-up is driven thereby to make access to the target track by jumping several tracks. Subsequently, access is made to a predetermined sector on the target track. This access will be explained by reference to a conventional case of a magneto-optic disc shown in FIG. 2. As is well known, a magneto-optic disk is formed of a substrate and a magnetic recording layer supported thereon to store information.

FIG. 2(a) is a plan view of the disk 1. In this diagram, reference numeral 6 designates tracks. Further , a mark 7 is provided on the disk 1. When the disk 1 rotates and the optical pick-up detects a sector signal on a track 6, the mark 7 is immediately detected by use of a photo-sensor. Each time the disk makes a revolution, a pulse signal is taken out and used as an index indicating the rotational position. FIG. 2(b) shows a sector signal detected from the optical pick-up 2. (This sector signal contains a track signal indicating a track No.) Each track has a plurality of sectors, at the forward end of which a sector signal 8 is produced as an address information. The signal 9 thus forms a portion having the data recorded therein magneto-optically. From the signal produced by the mark 7, the starting position of each track is determined, and a leading sector is detected and used as a timing of reading the data.

In the aforementioned configuration, it is necessary to read an address signal such as track No. and sector No. on the disk several times in order to make access to a target track. This necessitates a circuit for reading an address signal and further a circuit for judging a track No. and controlling the access, thereby posing a problem that the circuit size to accomplish this is too large for a circuit to be added to the drive.

Also, it is necessary to form a mark on the disk in order to produce an index signal as explained above. Therefore, the preparation of a disk requires a process other than merely forming tracks. Furthermore, a photo-sensor is required in the drive for detecting a mark.

SUMMARY OF THE INVENTION

The object of the present invention is to provide a magneto-optic disk capable of solving the above-mentioned problems, wherein a position-detecting track is provided for each several ordinary tracks, and/or a plurality of address information blocks including sector information and track information are arranged at irregular intervals on the tracks, i.e., the intervals of the address information blocks on the position-detecting tracks are different from the intervals of the address information blocks on the ordinary tracks, and the ordinary tracks include address information blocks arranged at equal first intervals at some portion of each of the ordinary tracks and at a second interval unequal to the first intervals at another portion of each of the ordinary tracks. This configuration enables the optical pick-up to detect a position-detecting track arranged for each predetermined number of tracks, and to make access to a target track by track jump as located relatively to the present track. On the other hand, the address information, which are detected by an optical pick-up, have the intervals thereof measured by a timer or the like, and if the intervals thereof are irregular, a pulse is generated from a logic circuit, thus producing an index signal for a sector.

BRIEF DESCRIPTION OF THE DRAWINGS

FIG. 5(a) is a partially enlarged view illustratively showing a magneto-optic disk according to an embodiment of the present invention, FIG. 5(b) shows a trace line of the optical pickup along the tracks of a disk, FIG. 6 is a diagram showing an index track detection circuit, FIGS. 7(a)–7(d) show wave forms produced at various parts of FIG. 6, FIG. 8 is a diagram showing a detection circuit of an index sector signal, FIGS. 9(a)–9(e) show wave forms at various parts of FIG. 8.

DETAILED DESCRIPTION OF PREFERRED EMBODIMENTS

Figure 1:
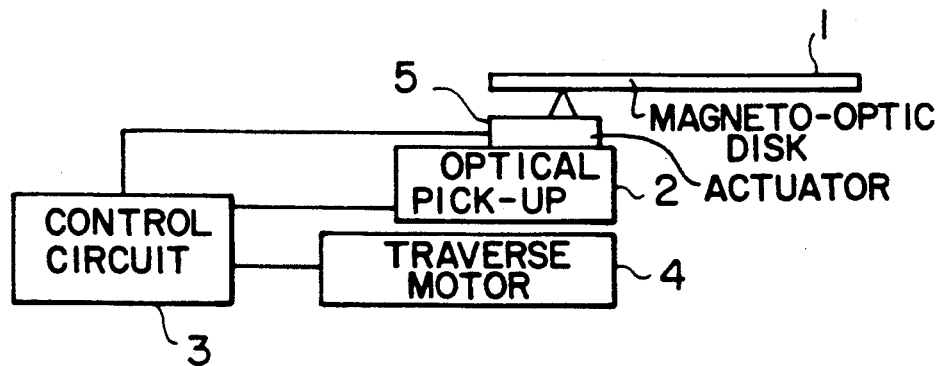
FIG. 1 is a diagram showing a general configuration for track access of a conventional magneto-optic disk, FIGS. 2(a) and (b) are a general plan of a conventional magneto-optic disk and a diagram showing a sector signal thereof, respectively.
Figure 2A:
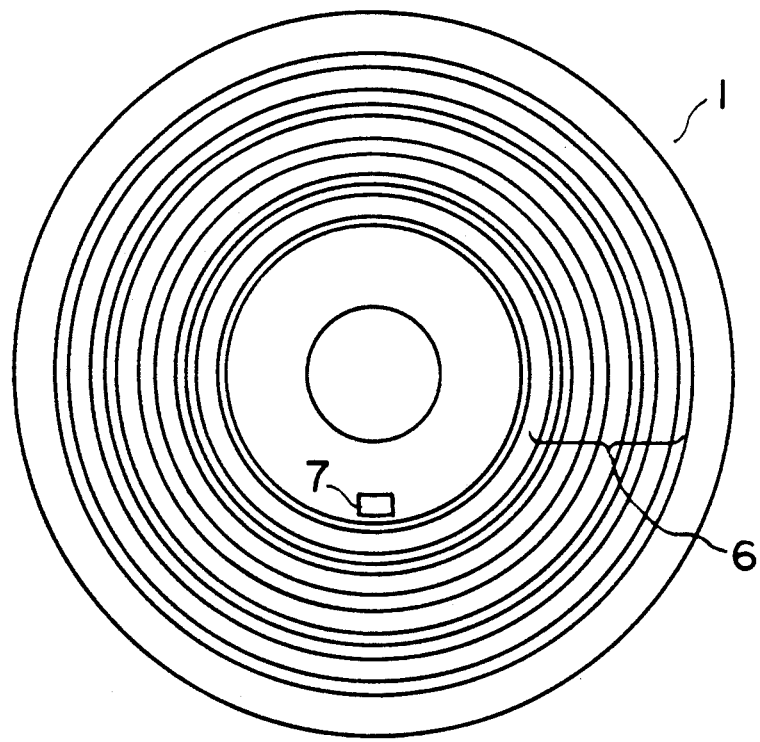
Figure 2B:
Figure 3:
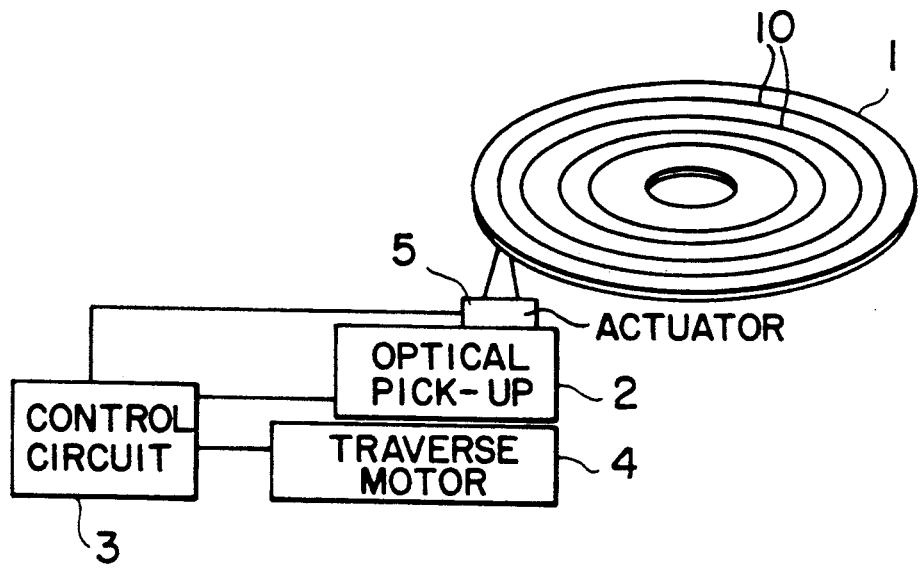
FIG. 3 is a diagram showing a general configuration for track access of a magneto-optic disk according to the present invention.
Figure 4:
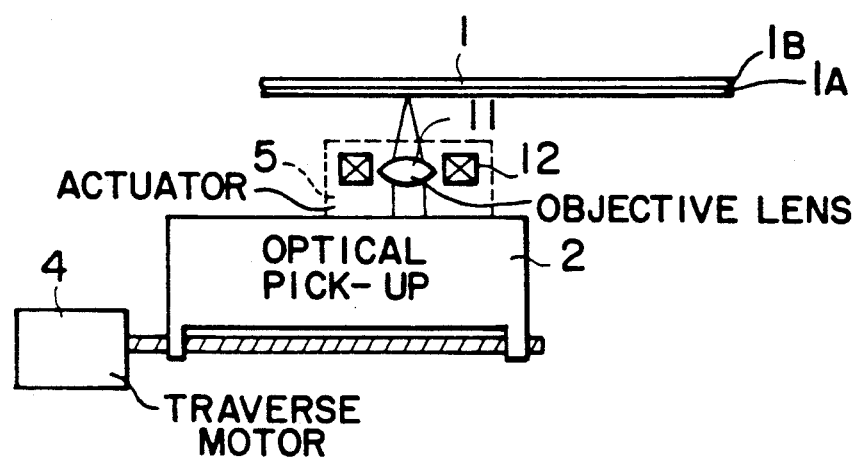
FIG. 4 is a diagram showing the parts of FIG. 3 in detail.

The present invention will be described in detail with reference to the attached drawings. FIG. 3 is a schematic diagram for explaining the access to a target track, and includes some component parts identical to those designated by the same reference numerals in FIG. 1. In FIGS. 3 and 4, 1 designates a magneto-optic disk including a substrate 1A and a recording layer 1B as illustrated in FIG. 4, in which ordinary or first tracks 10A (see FIG. 5a)) have an address pit at each sector, and in addition, a plurality of track-position-detecting tracks 10 are arranged with a pit provided over the entire periphery thereof and are positioned such that successive tracks 10 have a predetermined number of first tracks 10A, for example 100, positioned therebetween. As a result, an optical pick-up 2 can easily detect the position-detecting track 10 in response to the presence or absence of a signal without the necessity of reading any address information. That is, the detection of the track position detecting track 10 can be accomplished without reading address information but rather merely by detecting the presence or absence of a signal, thus eliminating the necessity of employing an electronic circuit to read a complex address signal. A traverse motor 4 is used for making access to a target track. In the present case, a stepping motor is driven to make rough feed of optical pick-up 2 at every 100 tracks, and at that particular position, an actuator 5 detects the position-detecting track 10 by track jump, further followed by a required number of track jumps to make access to a target track. In the case of making access to track 1234 with the outer periphery as track 0, for example, the stepping motor 4 is driven first by 12 steps, and at that position, a position-detecting track is detected by track jump of the actuator, followed by 34 track jumps to make access to the target track 1234. In the foregoing access, the control circuit 3 simply effects the stepping operation of the stepping motor for track jump and is not required to read the address information, thereby leading to a very simple operation.

Now, this operation will be explained more specifically.

In making access to a selected track, as shown in FIG. 4, the traverse motor 4 is driven to make rough feed of the optical pick-up 2 at every 100 tracks approximately, and at the track position which has been reached by the rough feed, an objective lens 11 of the actuator 5 is subjected to track jump by a driving coil 12 thereby making it possible to make access to a predetermined track. In a configuration for detecting a track position in order to make access to a predetermined track in the process, a position-detecting track 10 (see FIG. 5(a)) is provided as an index track at intervals of, for example, each 100 tracks 10A. FIG. 5(a) illustrates an enlarged partial view of the magnetic disk 1. Track 10 has address pit patterns or address information block 13 indicating the track No. and sector No. more densely than in the ordinary tracks 10A. In making access to the track No. 1234, for instance, six steps are made if the present position is the track No. 500. Since the input accuracy of the traverse motor 4 is obtained within about 50 μm, the objective lens is moved to the substantially central position of the tracks 1100 and 1200. Namely, as traverse motor 4 makes rough feed of optical pickup 2, optical pickup 2 traverses the tracks along the trace line shown in FIG. 5(b). FIG. 5(b) illustrates the relationship between the address pit patterns 13 in track 10 and the waveform of FIG. 7(a).

At this time, the reproduction signal from the optical pick-up is obtained from an address pit pattern 13 as a signal and produced in the form of a signal shown in FIG. 7(a). This signal is applied to a monostable multivibrator 14 shown in FIG. 6, whereby a pulse shown in FIG. 7(b) corresponding to the pre-pit position is obtained. By applying this pulse further to a monostable multivibrator 15 shown in FIG. 6, a pulse is produced for detecting an index track. Specifically, with the pulses shown in FIGS. 7(b) and (c) passed through the NAND circuit of FIG. 6, no pulse is generated in an ordinary track but upon jump to an index track, a pulse as shown in FIG. 7(d) is generated, from which the arrival at an index track is easily seen. In other words, the objective lens 11 is jumped one track each time by a lens-driving coil, so that an index track is detected by several tens of jumps, thus making clear that access is made to the track number 1200. As a result, another 34 jumps make it possible to make access to the target track 1234.

Now, a configuration for making access to a predetermined sector of a predetermined track will be explained.

FIG. 5(a) shows a schematic partially enlarged view of the magneto-optic disk 1. As shown in FIG. 5(a), the address pit patterns or address information blocks 13 indicative of the track numbers and the sector numbers are arranged at a first spatial interval at some positions on the tracks 10A and at a second spatial interval that is unequal to the first spatial interval at other positions on the tracks 10A. In an example of the arrangement of address pit patterns 13 shown in FIG. 5(a), the second spatial interval between neighboring address pit patterns 13 is l, while the first intervals between neighboring address pit patterns 13 are doubled to be 2l. Data portions 23 are located in areas between address information blocks 13 arranged at the first interval at 2l.

FIG. 8 shows a detection circuit for detecting an index signal providing a reference signal for making access to a predetermined sector, and FIGS. 9(a)–9(e) show wave-forms at various portions of the circuit. First, a header signal, shown in FIG. 9(a), illustrates the address information read out of each track shown in FIG. 5(a). An index signal is produced by use of this signal as described in detail below. In the process, the first interval between signals A and B is set shorter than the second intervals for signals subsequent to B. Upon application of this header signal shown in FIG. 9(a) to the monostable multivibrator 17, a pulse train shown in FIG. 9(b) corresponding to the header signal of FIG. 9(a) is obtained. When this pulse train is further applied to a monostable multivibrator 18, a pulse train shown in FIG. 9(c) is obtained. By applying these pulses of FIGS. 9(b) and (c) to the AND circuit 19, an index signal as shown in FIG. 9(d) is produced.

In the aforementioned embodiment, a plurality of header information are shortened in interval at one point. Even if such an interval is lengthened or intervals at a plurality of points are changed, however, no practical problem is posed.

Figure 10:
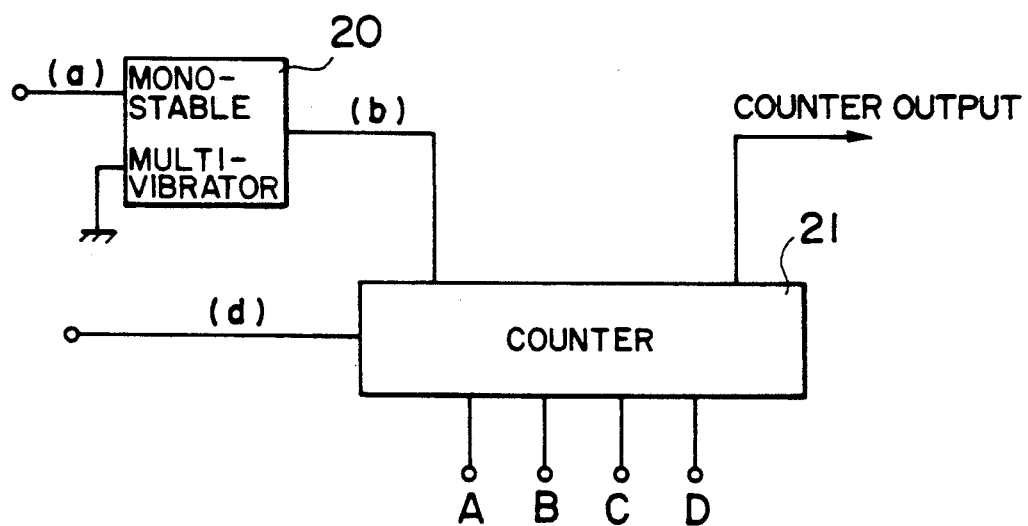
FIG. 10 is a diagram showing a detection circuit for detecting a predetermined sector.

As explained above, making access to a predetermined track produces an index signal indicating the starting of a sector as shown in FIG. 9(d). Explanation will be made about a configuration for making access to a predetermined sector by use of this index signal. A reproduction signal shown in FIG. 9(a) of a pre-pit pattern is applied from an optical pick-up to a monostable multivibrator 20 shown in FIG. 10, thereby producing a pulse (b) indicating a sector position. This signal (b) is applied to a counter 21, and an index signal (see FIG. 9(d)) is used as a reset signal for the counter 21. If a target sector is input in the counter in the form of binary code of, say, A, B, C and D, a pulse (see FIG. 9(e)) indicating that successful access has been made to the target sector is produced upon rotation of the disk and arrival of the objective lens at the target sector. Thus, the recording and reproducing operation is capable of being started at the timing of this pulse of FIG. 9(e) for the magneto-optic disk.

INDUSTRIAL APPLICABILITY

The use of a disk having recorded therein the format information according to the present invention as explained above permits a target track or sector to be accessible without reading pit address information, thus greatly simplifying the configuration of the control circuit used for access. Specifically, the conventional magnetic magneto-optic disks, in which the codes of the track number and sector number in a pre-pit are decoded for making access to a track, require a circuit of considerable size and a microcomputer or the like for decoding. In view of the need to produce an actual drive in as compact a form as possible, the configuration requiring a circuit of large size makes it difficult to realize a compact drive. The configuration according to the present invention thus facilitates production of a compact drive while maintaining a low overall cost.

I claim:

1. A magneto-optic disk comprising: a substrate and a recording layer supported thereon and having a plurality of first tracks each having (a) a plurality of address information blocks recorded thereon, said address information blocks including track information and sector information, said plurality of address information blocks being arranged at equal first intervals at some portions of each of said tracks and at a second interval unequal to said first intervals at another portion of each of said tracks, and (b) a plurality of data portions located in areas between said address information blocks arranged at said first intervals.

2. A magneto-optic disk as in claim 1 further comprising a plurality of track position detecting tracks smaller in number than said plurality of first tracks and positioned such that successive track position detecting tracks have a predetermined number of said first tracks located therebetween, wherein each of said track position detecting tracks includes a plurality of address information blocks of address pit patterns providing address information including track information and sector information and said track position detecting tracks contain a larger number of said address information blocks than the number of said address information blocks contained in said first tracks.

3. A magneto-optic system comprising:
a magneto-optic disk including a substrate and a recording layer supported thereon and having a plurality of first tracks recorded thereon each having (a) a plurality of address information blocks, said address information blocks including track information and sector information, said plurality of address information blocks being arranged at equal first intervals at some portions of each of said tracks and at a second interval unequal to said first intervals at another portion of each of said tracks, and (b) a plurality of data portions located in areas between said address information blocks arranged at said first interval; and means for scanning said another portion of one of said tracks at which said address information blocks are arranged at said second interval in order to detect an index signal.

4. A magneto-optic disk as in claim 3 further comprising a plurality of track position detecting tracks smaller in number than said plurality of first tracks and including a plurality of address information blocks of address pit patterns providing address information including track information and sector information, said address information blocks of said track position detecting tracks having a different spacing from that of said address information blocks of said first tracks, said track position detecting tracks being positioned such that successive track position detecting tracks have a predetermined number of said first tracks located therebetween.

* * * * *